Patented May 11, 1948

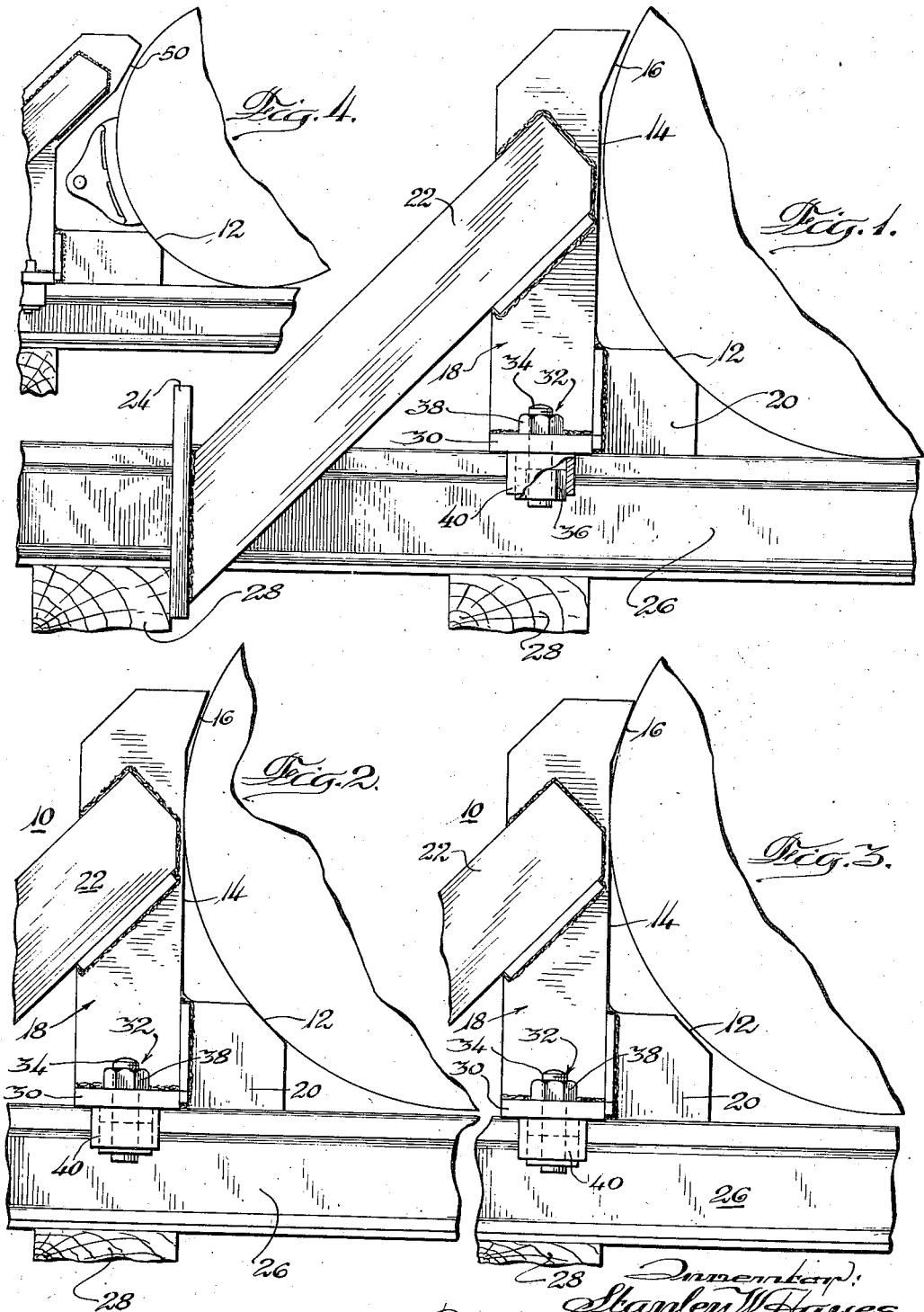

2,441,148

UNITED STATES PATENT OFFICE 2,441,148

WHEEL STOP

Stanley W. Hayes, Richmond, Ind., assignor to Hayes Track Appliance Company, Richmond, Ind., a corporation of Indiana Application April 17, 1944, Serial No. 531,416

8 Claims. (Cl. 104—258)

The present invention is directed to a new and improved wheel stop of a type commonly referred to as a scotch block, or the like used on railway tracks and, more particularly, it is an improvement over the wheel stops disclosed and claimed in my copending application Ser. No. 531,415 (a continuation-in-part of application Serial No. 459,136, filed September 21, 1942) filed contemporaneously herewith, and now abandoned.

In the aforesaid co-pending application there are disclosed and claimed wheel stops including a pair of spaced apart wheel abutments. In a preferred embodiment of the stop a lower abutment is inclined at an angle such that a wheel may rise therealong and the second abutment is located higher than the lower one and is so configured that a wheel will not rise therealong. The abutment surfaces are so disposed that wheels for which the stop is primarily intended will strike only the lower abutment at lower speeds and at higher speeds will strike first the lower abutment and then the upper abutment. As a result, there is always applied to the wheel stop a downward component of thrust, through the lower abutment, which reduces the overturning moment resulting from the impact of a car wheel against either the lower or both abutment surfaces.

The primary object of the present invention is the provision of a new and improved wheel stop including a pair of wheel abutment surfaces, the uppermost one of which prevents upward movement of a wheel striking it.

Another object of the present invention is to provide a new and improved wheel stop including a plurality of wheel abutment surfaces, the first of which is configured so that a wheel striking it will rise therealong and which is the only stop encountered by wheels at low speed, the second of which is configured so that a wheel striking it will not rise therealong and which is located above the first abutment surface, and the third of which is configured to prevent a wheel striking it from rising therealong and which is located above the second abutment and above the level of the car wheel axle.

A further object of the present invention is to provide a new and improved wheel stop capable of being used with railroad passenger cars and the like where braking apparatus is located at the outsides of the wheels, rather than between them, as in freight cars.

Other objects and advantages of the present invention will become apparent from the ensuing description in the course of which reference is had to the accompanying drawing, in which Figure 1 a side elevational view, partly broken away better to illustrate details thereof, of a wheel stop embodying the present invention;

Figures 2 and 3 are fragmentary side elevational views illustrating a car wheel in various positions relative to the wheel stop; and Figure 4 is a fragmentary side elevational view, on a reduced scale, of another embodiment of the present invention.

Referring now to Figures 1, 2, and 3, it may be noted that the wheel stop of the present invention has been indicated as a whole by reference character 10. While only one stop has been illustrated, it is contemplated that two stops will be utilized in the usual installation, one stop for each rail.

The wheel stop is characterized, in the main, by the provision of an upper wheel abutment surface which prevents the rise of a wheel coming in contact therewith and which is preferably so located relative to another and lower abutment surface that it is not struck by a wheel unless the wheel is travelling at a relatively high rate of speed.

The wheel stop 10 includes a plurality of wheel abutment surfaces 12, 14, and 16 located at different points lengthwise as well as vertically of the rail. These abutment surfaces are preferably formed by cutting a metal plate indicated as a whole by reference character 18 with surfaces of the desired configurations.

The abutment surface 12, which may be considered to be the lower forward abutment surface, is inclined upwardly and rearwardly so that a wheel striking it will rise a short distance therealong. In the instant case, the surface is inclined at an angle of about 45° and it is formed by cutting away the upper forward corner of a lower extension 20 of plate 18.

The abutment surface 14, which may be considered to be an intermediate abutment surface, is preferably constituted by the generally vertical forward edge of the main portion of the plate 18. This abutment surface extends somewhat above the level of the car wheel axle so that it is engageable by a wheel rising along abutment surface 12.

The abutment surface 16, which may be referred to as the upper forward abutment surface, extends forwardly and upwardly from the intermediate abutment surface so as to prevent a wheel from rising therealong. It has been illustrated as being slanted so as to engage a wheel substantially tangentially, although other configurations may be used.

The wheel stop includes also a pair of diverging and downwardly and rearwardly extending bars 22 and a generally U-shaped saddle 24 disposed in inverted postion and straddling the rail 26. The forward ends of the bars 22 are secured, as by welding, to the sides of the plate 18 in the vicinity of the intermediate abutment surface 14. The rear ends of the bars are secured in abutting relation to the saddle at substantially the level of the rail although the lower extremities of the bars and saddle extend below the base of the rail into abutting relation with a tie 28, as illustrated in Figure 1, whereby the shock of impact is transmitted to the ties and ballast.

The vertically disposed plate 18 has a thickness of about one inch, a width of about six inches over its major portion, and rises to a height of about twenty inches above the top of the rail, i. e., a height somewhat greater than the radius of the normal size railroad car wheel which has a diameter of thirty-three inches. The forward extension 20 of the plate rests upon the top of the rail and the rear portion rests upon and is secured, as by welding, to a horizontal bar 30 disposed transversely of and extending beyond the sides of the rail head to receive holding means 32 located at opposite sides of the stop (only one of which is shown in the drawing). The holding means is constructed and arranged, as disclosed and claimed in my co-pending application, to permit the stop to slide along the rail under car wheel impact. Each of the holding means includes a bolt 34 extending through an aperture (not shown) in the horizontal bar 30 and having a head 36 provided with an inclined portion adapted to engage the underside of the rail head. The bolt is drawn up by a nut 38 until the head of the bolt engages the underside of the rail head. The bolts and bolt heads support the wheel stop in vertical position on and prevent it from rising above the top of the rail head and the inclined portions of the head center the stop on the rail.

The bolts are kept properly positioned relative to the rail heads by retainers 40, which are short pieces of channel iron secured to the underside of the horizontal bar with their open sides facing the rail and the webs lapping under the horizontal bar a short distance as about one-eighth of an inch. It is preferred that the bolt head 36 be dimensioned to engage the inner sides of the retainer in order to prevent the bolt from bending and to maintain the bolt head in contact with the rail head. Thus as the stop moves along the rail, the bolt is moved with it. In practice the bolt is tightened firmly, but even so the stop will slide along the top of the rail under car wheel impact.

In the embodiment of the invention illustrated in Fig. 4 only two abutment surfaces are utilized. These are a lower abutment surface 12 and an upper abutment surface 50. While the wheel stop includes a vertical surface, the location of surfaces 12 and 50 is such that the vertical surface is actually not contacted by a wheel of a size for which the stop is designed. While it is preferred that the surface 12 alone be engaged at lower speeds and that surfaces 12 and 50 be engaged at the higher speeds, the arrangement could be such that surfaces 12 and 50 are engaged substantially simultaneously, at least by the largest sized wheel for which the stop is designed.

The embodiment of the invention illustrated in Fig. 4 is particularly advantageous for use in stopping passenger cars, which have the brakes on the outer sides of the wheels, as distinguished from freight cars, in which the brakes are located between wheels and are, therefore, not likely to be struck by the wheel stop. The vertical surface is thus so located that the braking apparatus on the car will not strike it.

In operation, the wheel stop, after being installed on the rail in the position indicated in the drawing, transmits the shock of the car wheel impact to the saddle 24 through the bars 22 and the saddle in turn transmits the impact to the tie and the ballast. The tie and ballast yield more or less depending on the nature of the ballast as well as upon the force of the impact to provide a cushion stop.

The action of the stop is dependent upon the size of the wheel striking it. In the first embodiment of the invention, it is preferred that the abutment surfaces be so located that the largest sized wheels for which the stop is primarily designed engage the lower abutment surface 12 first, so that at lower speeds this abutment is the only one engaged, while at higher speeds the wheels rise therealong a short distance and also engage one of the other abutment surfaces. It is preferred further that the other abutment surface thus engaged be the abutment surface 14, as illustrated in Fig. 2. The third and uppermost abutment surface 16 serves to prevent the wheel from rising, at least unless the wheel move backwardly a distance so that the wheel is prevented from climbing over the wheel stop. Inasmuch as the lower abutment surface is inclined, it is subjected to both a horizontal and downward component of force. The downward component of force relieves the strain on the bolts 34 and likewise reduces the overturning moment applied to the stop as a whole. This result obtains irrespective of whether the lowermost abutment surface 12 alone or two abutment surfaces are engaged. The same result would obtain also if two of the abutment surfaces, or for that matter, all three abutment surfaces, are simultaneously engaged.

In the second embodiment of the invention illustrated in Fig. 4, it is preferred, as heretofore indicated, that the lowermost abutment surface 12 be engaged first. The action in this event is substantially the same as that of the first described embodiment except that the second abutment engaged by the wheel is the upwardly and forwardly inclined abutment 50 preventing the wheel from rising. This stop may be used with either freight or passenger cars, but is particularly advantgeous with the latter because of the room provided for the braking apparatus.

It should be understood that, while the present invention has been described in connection with specific details of two embodiments thereof, these details are not to be construed as limitative of the invention except in so far as set forth in the accompanying claims.

What I claim as new and desire to secure by United States Letters Patent is as follows:

1. In a wheel stop adapted to be seated upon a rail, structure providing a pair of wheel abutments rising above the top of the rail, one of said abutments including an upper abutment surface above the level of the car wheel axle and having a configuration such and so located that a wheel striking it is prevented from rising therealong, and the other of said abutments including an abutment surface at a lower level, said lower abutment surface having a configurattion enabling a wheel to rise therealong and being so located relative to the first mentioned abutment surface that wheels for which the stop is primarily intended strike the lower abutment surface only at lower speeds, and at higher speeds strike first the lower surface and then the upper one, whereby the engagement of the wheel with the lower surface is effective to produce a downward component of force reducing the overturning moment resulting from the impact of a car wheel and engagement with the upper abutment surface prevents the car wheel from rising, and means for holding the stop seated on the rail.

2. In a wheel stop adapted to be seated upon a rail, structure providing a plurality of wheel abutments rising above the top of the rail, one of said abutments including an upper abutment surface having a configuration such that a wheel striking it is prevented from rising therealong, another of said abutments including an intermediate abutment surface having a configuration such and so located that a wheel striking it will have no tendency to rise along the surface, and a third abutment including an abutment surface at a lower level and forward of said intermediate abutment surface, said lower abutment surface having a configuration enabling a wheel to rise therealong and being so located relative to the first mentioned abutment surfaces that the largest wheels for which the stop is primarily intended strike only the lower abutment surface at reduced speeds, and at higher speeds strike the lower abutment first and then the intermediate abutment surface, whereby the engagement of the wheel with the lower abutment surface is effective to produce a downward component of force reducing the overturning moment resulting from the impact of a car wheel against either the lower or both the lower and intermediate abutment surfaces, and means for holding the stop seated on the rail.

3. In a wheel stop adapted to be seated upon a rail, structure providing a pair of wheel abutments rising above the top of the rail, one of said abutments including an upper abutment surface above the level of the car wheel axle and inclined upwardly and in the direction from which the stop is approached by a car wheel, whereby a car wheel striking said surface is prevented from rising therealong, and the other of said abutments including an abutment surface at a lower level and extending downwardly and forwardly whereby a wheel is enabled to rise therealong, said abutment surfaces being so located relative to each other that the largest wheels for which the stop may be used strike both abutment surfaces simultaneously and smaller wheels strike the lower abutment surface first only at lower speeds and at higher speeds strike the lower abutment surface first and then the upper abutment surface, and means for holding the stop seated on the rail.

4. In a wheel stop adapted to be seated upon a rail, a first wheel abutment comprising structure rising above the top of a rail to a height substantially less than the height of the wheel axle and having an abutment surface configured to enable a wheel to rise therealong, and a second wheel abutment comprising structure connected to the first structure having a second abutment surface located to the rear of the first and above the height of the wheel axle, said second abutment surface being configured so that a wheel striking it is prevented from rising therealong, and said surfaces being so located that the largest size of wheel for which the stop may be used strikes both abutment surfaces substantially simultaneously, and smaller wheels either strike the first abutment surface only or the two abutment surfaces dependent upon the rate of travel of the wheels, and means for holding the stop seated on the rail.

5. In a wheel stop adapted to be seated upon a rail, structure providing a plurality of wheel abutments rising above the top of the rail, one of said abutments including an upper abutment surface having a configuration such that a wheel striking it is prevented from rising therealong, and another abutment including an abutment surface at a lower level, said lower abutment surface having a configuration enabling a wheel to rise therealong and being so located relative to the upper abutment surface that wheels for which the stop is primarily intended strike only the lower abutment surface at reduced speeds and at higher speeds strike the lower abutment first and then also the upper abutment, whereby the engagement of the wheel with the lower abutment surface is effective to produce a downward component of force reducing the overturning moment resulting from the impact of a car wheel against either the lower or both abutment surfaces, and said abutment surfaces being connected by structure providing room for braking apparatus attached to the car and disposed on the outside of the car wheel, as in railroad passenger cars, and means for holding the stop seated on the rail.

6. In a wheel stop adapted to be seated upon a rail, structure providing a pair of wheel abutments rising above the top of the rail, one of said abutments including an upper abutment surface above the level of the car wheel axle and inclined forwardly and upwardly so that a wheel striking it is prevented from rising therealong, and the other of said abutments including an abutment surface at a lower level and forward of said upper abutment surface, said lower abutment surface being inclined upwardly and rearwardly to enable a wheel to rise therealong and being so located relative to the first mentioned abutment surface that wheels for which the stop is primarily intended strike the lower abutment surface only at lower speeds, and at higher speeds strike first the lower surface and then also the upper one, whereby the engagement of the wheel with the lower surface is effective to produce a downward component for force reducing the overturning moment resulting from the impact of a car wheel against either the lower or both abutment surfaces, and means for holding the stop seated on the rail.

7. In a wheel stop adapted to be seated upon a rail, structure providing a plurality of wheel abutments rising above the top of the rail, one of said abutments including an upper abutment surface inclined forwardly and upwardly so that a wheel striking it is prevented from rising therealong, another of said abutments including a generally vertical intermediate abutment surface so that a wheel striking it will have no tendency to rise along the surface, and a third abutment including an abutment surface at a lower level and forward of said intermediate abutment surface, said lower abutment surface being inclined upwardly and rearwardly to enable a wheel to rise therealong and being so located relative to the other abutment surfaces that the largest wheels for which the stop is primarily intended strike only the lower abutment surface at reduced speeds and at higher speeds strike the lower abutment first and then the intermediate abutment surface, whereby the engagement of the wheel with the lower abutment surface is effective to produce a downward component of force reducing the overturning moment resulting from the impact of a car wheel against either the lower or both the lower and intermediate abutment surfaces, and means for holding the stop seated on the rail.

8. In a wheel stop adapted to be seated upon a rail, structure providing a plurality of wheel abutments rising above the top of the rail, one of said abutments including an upper abutment surface inclined forwardly and upwardly so that a wheel striking it is prevented from rising therealong, another abutment including an abutment surface at a lower level inclined upwardly and rearwardly to enable a wheel to rise therealong, and structure interconnecting said abutment surfaces providing room for braking apparatus attached to a car and disposed on the outer side of the car wheel, as in railroad passenger cars, said abutment surfaces being so located that the wheels for which the stop is intended strike either the lower abutment surface alone or both abutment surfaces, whereby the engagement of the wheel with the lower abutment surface is effective to produce a downward component of force reducing the overturning moment resulting from the impact of a car wheel against either the lower or both abutment surfaces, and means for holding the stop seated on the rail.

STANLEY W. HAYES.